United States Patent
Greinert et al.

(10) Patent No.: US 10,007,165 B2
(45) Date of Patent: *Jun. 26, 2018

(54) ELECTROPHORETIC FLUIDS

(71) Applicant: Merck Patent GmbH, Darmstadt (DE)

(72) Inventors: Nils Greinert, Seeheim-Jugenheim (DE); Thomas Bauer, Darmstadt (DE); Matthias Koch, Wiesbaden (DE); Wolfgang Hechler, Lautertal (DE); Nathan Smith, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 84 days.

This patent is subject to a terminal disclaimer.

(21) Appl. No.: 14/418,465

(22) PCT Filed: Jul. 22, 2013

(86) PCT No.: PCT/EP2013/002163
§ 371 (c)(1),
(2) Date: Jan. 30, 2015

(87) PCT Pub. No.: WO2014/019650
PCT Pub. Date: Feb. 6, 2014

(65) Prior Publication Data
US 2015/0168797 A1    Jun. 18, 2015

(30) Foreign Application Priority Data
Aug. 1, 2012 (EP) .................................. 12005586

(51) Int. Cl.
*G02B 26/00* (2006.01)
*G02F 1/167* (2006.01)
*C09B 69/10* (2006.01)

(52) U.S. Cl.
CPC ............ *G02F 1/167* (2013.01); *C09B 69/101* (2013.01); *C09B 69/106* (2013.01); *G02F 2001/1678* (2013.01); *G02F 2202/04* (2013.01)

(58) Field of Classification Search
USPC ...................... 106/493; 359/296; 252/519.33; 427/213.36, 213.31
See application file for complete search history.

(56) References Cited

U.S. PATENT DOCUMENTS

| | | | |
|---|---|---|---|
| 5,284,922 A | 2/1994 | Amano et al. | |
| 5,380,362 A * | 1/1995 | Schubert | G03G 17/04 106/493 |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 7,349,147 B2 | 3/2008 | Chopra et al. | |
| 7,374,634 B2 | 5/2008 | Wang et al. | |
| 7,411,720 B2 | 8/2008 | Honeyman et al. | |
| 7,502,161 B2 | 3/2009 | Chopra et al. | |
| 7,652,656 B2 | 1/2010 | Chopra et al. | |
| 8,072,675 B2 | 12/2011 | Lin et al. | |
| 8,698,734 B2 | 4/2014 | Sato | |
| 8,786,935 B2 | 7/2014 | Sprague | |
| 8,810,899 B2 | 8/2014 | Sprague et al. | |
| 2002/0180688 A1 | 12/2002 | Drzaic et al. | |
| 2005/0000813 A1 | 1/2005 | Pullen et al. | |
| 2005/0168799 A1* | 8/2005 | Whitesides | B82Y 30/00 359/296 |
| 2006/0025499 A1 | 2/2006 | Van Brocklin et al. | |
| 2007/0128352 A1 | 6/2007 | Honeyman et al. | |
| 2007/0268244 A1 | 11/2007 | Chopra et al. | |
| 2009/0290208 A1 | 11/2009 | Murata et al. | |
| 2010/0053728 A1 | 3/2010 | Lin et al. | |
| 2011/0255145 A1 | 10/2011 | Masuzawa et al. | |
| 2012/0134010 A1 | 5/2012 | Sprague et al. | |
| 2015/0092262 A1* | 4/2015 | Greinert | C09C 1/3676 359/296 |

FOREIGN PATENT DOCUMENTS

| | | |
|---|---|---|
| CN | 101080665 A | 11/2007 |
| CN | 101870827 A | 10/2010 |
| CN | 102272672 A | 12/2011 |
| CN | 102486592 A | 6/2012 |
| EP | 1491941 A2 | 12/2004 |
| EP | 11006912.7 | 8/2011 |
| EP | 11009486.9 | 11/2011 |
| EP | 2407824 * | 1/2012 |
| EP | 2407824 A1 | 1/2012 |
| EP | 12002438.5 | 4/2012 |
| GB | 1234072 A | 6/1971 |
| GB | 1261350 A | 1/1972 |
| GB | 1262092 A | 2/1972 |
| GB | 2040978 A | 9/1980 |
| GB | 2438436 A | 11/2007 |
| JP | S59187061 A | 10/1984 |
| JP | S614764 A | 1/1986 |
| TW | 201106078 A | 2/2011 |
| WO | WO-199502848 A1 | 1/1995 |
| WO | WO-99/10767 A1 | 3/1999 |
| WO | WO-2004023195 A2 | 3/2004 |
| WO | WO-2004034139 A1 | 4/2004 |
| WO | WO-2005017046 A2 | 2/2005 |
| WO | WO-2007053012 A1 | 5/2007 |

(Continued)

OTHER PUBLICATIONS

International Search Report for PCT/EP2013/002163 dated Nov. 6, 2013.

*Primary Examiner* — Monique Peets

(57) ABSTRACT

This invention relates to electrophoretic fluids, the use of these fluids for the preparation of an electrophoretic display device, and electrophoretic displays comprising such fluids.

14 Claims, 1 Drawing Sheet

(56) References Cited

FOREIGN PATENT DOCUMENTS

Figure 1:
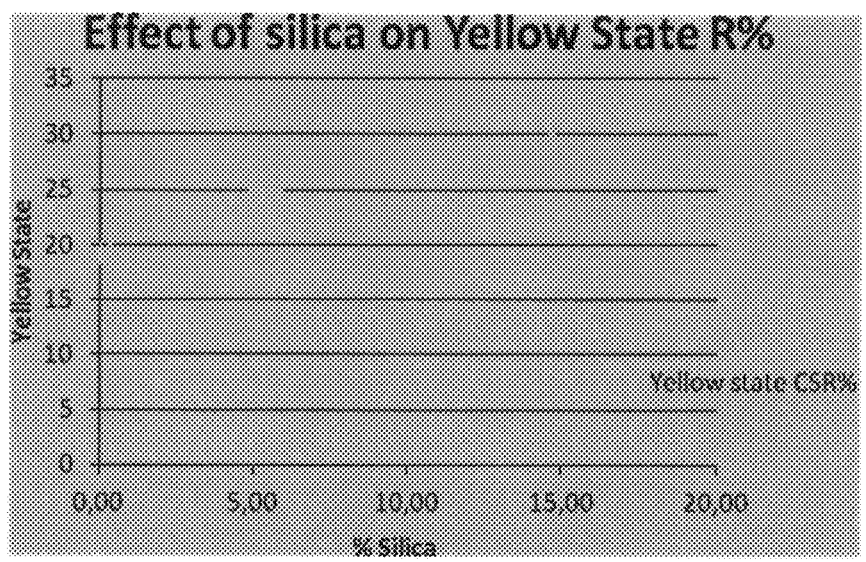

| | | |
|---|---|---|
| WO | WO-20070128352 A1 | 11/2007 |
| WO | WO-2008055846 A1 | 5/2008 |
| WO | WO-2009100803 A2 | 8/2009 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |
| WO | WO-2011154103 A1 | 12/2011 |
| WO | WO-2011154104 A1 | 12/2011 |
| WO | WO-2012019704 A1 | 2/2012 |
| WO | WO-2012047000 A2 | 4/2012 |
| WO | WO-2013026519 A1 | 2/2013 |
| WO | WO-2013079146 A1 | 6/2013 |
| WO | WO-2013079158 A1 | 6/2013 |
| WO | WO-2013149714 A1 | 10/2013 |

* cited by examiner

ELECTROPHORETIC FLUIDS

This invention relates to electrophoretic fluids, the use of these fluids for the preparation of an electrophoretic display device, and electrophoretic displays comprising such fluids.

Particles suitable for use in electrophoretic displays (EPD), e.g. coloured electronic paper have been exemplified in recent patent literature; e.g. (U.S. Pat. No. 7,304,634, GB 2 438 436, US 2007/0268244). It is now possible to control and manipulate features such as size, colour, charge and polydispersity independently to produce particles with desired properties for EPD; e.g. WO 2010089057. A number of different techniques can be used to create an optical effect by the movement of particles.

One such method could incorporate the use of reflective colour particles, and absorbing black particles to generate a pixel that can be switched between a colour, and a black optical state.

The biggest challenge of such a system is obtaining a highly reflective colour state. Typical colour pigments that can be dispersed in solvents used for EPD do not show a high enough reflectivity to generate an appropriate optical difference. In addition, colour tuning of pigments is restrictive and the choice of colours is limited. High resolution printing and dispensing of such pigment dispersions is also very challenging. So, there continues to be a demand for improved electrophoretic fluids.

The present invention relates to electrophoretic fluids comprising at least one solvent, at least one set of coloured particles, at least one highly absorbing dye, at least one set of white reflective particles, and at least one set of transparent particles, wherein the coloured particles and the white reflective particles have opposite electric charge signs and wherein the white reflective particles and the transparent particles have the same electric charge sign and wherein the electrophoretic mobilities of the white reflective particles and the transparent particles differ at most by 50%. Preferably, the electrophoretic mobilities differ at most by 20%, especially at most by 10%. Particularly, the electrophoretic mobilities of the white reflective particles and the transparent particles differ at most by 5%. Electrophoretic mobilities are preferably measured using Malvern NanoZS Zetasizer equipment, or imaging microscopy. Preferably, particle mobilities are measured in the same solvent.

Furthermore, the invention relates to electrophoretic displays comprising such fluids.

The present invention provides improved electrophoretic fluids by incorporating a highly absorbing dye and a set of transparent particles into a dual particle electrophoretic fluid. Preferably, the electrophoretic fluids of the invention comprise at least one solvent, a set of black particles, a set of white reflective particles, a highly absorbing dye, and a set of transparent particles, wherein the white reflective particles and the transparent particles have electric charges and electrophoretic mobilities as described above and the black particles have opposite electric charge signs. When an electric field is applied, the white reflective particles and the transparent particles move with a similar velocity and compact while switching on the front electrode of an EPD cell.

By incorporating transparent particles and a highly absorbing dyed solvent in the interstices between the particles, increased colour saturation and reflectivity can be achieved. By applying a suitable driving scheme, increased colour saturation can also be achieved. Particle spacing can be either increased to give a black-yellow pixel with simple driving scheme, or reduced to give a Black-Yellow-White pixel, with a more complex driving scheme. By using dyes, chromophore adjustment can give an increased choice of colour and colour tuning for specific applications, e.g. a company logo, or colour gamut adjustment can be achieved.

By ensuring sufficient spacing between the white particles, a strongly coloured and highly reflective colour state can be achieved. In addition, by careful driving of the display, further increased colour saturation and grayscales can be achieved. Alternatively, by reducing the spacing between particles, a three-colour pixel could be achieved, whereby the display appears white when the white particles are compressed at the top of the electrode, black when the black particles are at the top electrode, or highly coloured when the particles are in transit.

Electrophoretic fluids of the invention comprise dyes and dye mixtures with high absorbance and preferably with increased solubility in non-polar solvents. Preferably, the dyes have an absorbance of at least 0.3 a.u., preferably of at least 0.5 a.u., especially of at least 0.7 a.u., in a cell thickness of 50 microns. Preferably, the absorbance is measured for a saturated solution of dyes in dodecane. Most advantageously used are dyes with an absorbance as high as possible. The absorbance data can be derived using the Lambert-Beer law $A=-\lg(I/I_0)=\varepsilon c d$, where A is the absorbance at a certain wavelength, I is the intensity of the transmitted radiation, $I_o$ is the intensity of the radiation before transmission, E is the molar extinction coefficient (l/mol cm), c is the concentration (mol/l), and d is the path length (cm). The absorbance is unitless. However, the absorbance is often reported in "arbitrary units" (a.u.) or in "Absorbance Units" (AU). Arbitrary units (a.u.) are used throughout the present invention.

The absorbance of the dyes can preferably be measured using a Hitachi U3310 UV-vis spectrophotometer and a saturated solution of dyes in dodecane.

The required solubility depends upon the extinction coefficient of the dye, but usually should be over 1% by weight and preferably >5% by weight. Dye solubilities of >20% by weight have been observed and can preferably be utilized in this method to give maximum colour saturation.

The function of the dye is to colour the electrophoretic fluid. The dye consists of a chromophore, optional linker groups (spacers), and optional groups to modify physical properties (like solubility, light fastness, etc.) and optionally charged group(s). Careful design of the dye structure and using a mixture of homologues can result in increased solubility.

The chromophoric group preferably comprises of conjugated aromatic (including heteroaromatic) and/or multiple bonds including: azo (including monoazo, disazo, trisazo linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and disazo) and anthraquinone groups.

A dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc.

Extended conjugated chromophores can also be used to obtain some shades. For example, di- and tris azo compounds can be used to obtain blacks and other duller shades (navy blue, brown, olive green, etc).

Mixtures of dyes can also be used to obtain the correct electrophoretic fluid shade. Similarly shades can be tuned by for example by adding small quantities of separate dyes to modify the colour of the electrophoretic fluid (e.g. 95% yellow and 5% cyan to get a greener yellow shade).

A particular focus is the use of mixtures of one chromophore. The solubilising groups on the chromophore are preferably hydrocarbon chains consisting of 4 or more carbons. These chains can be straight chain, branched chain, contain isomers such diastereoisomers, be optionally substituted with O, S, N, F. Preferably a mixture of homologues comprising hydrocarbon chains consisting of 8-20 carbons is used to give highest solubility. One advantage is that a mixture of homologues can be prepared in a one pot procedure, reducing cost of preparing individual dyes.

Dyes having improved solubility, preferably in non-polar solvents and hence higher absorbance of the resultant solution can preferably be used. By using a multi-component dye concept the solubility can be further increased to enable a highly absorbing material suitable for use in EPD. By mixing dyes of identical chromophore, but with altered surrounding structure, the overall solubility of the dye chromophore is increased, and higher absorbance values can be achieved. By adding dyes with similar chromophore/altered surrounding structure, a multi-component dye system results in enhanced solubility and absorbance. One advantage is that a mixture of homologues can be prepared in a one pot procedure, reducing cost of preparing individual dyes.

Advantageously, dye mixtures utilising the same chromophore but with variation of the solubilising groups are used. This gives hugely improved solubility. Surprisingly, when a mixture of the same chromophore but with different long hydrocarbon groups to increase solubility is used, solubility of up to 15% is achieved. Especially, combinations of dyes are used to achieve electrophoretic fluids with strong colour intensity.

Preferably, the electrophoretic fluid of the invention comprises at least one dye according to Formula I, Formula II, Formula III, Formula IV or Formula V

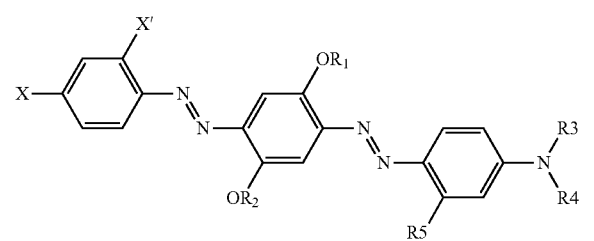

Formula I wherein

X and X' are independently of one another H or an electron-withdrawing group;

$R_1$ and $R_2$ are independently of one another groups are linear or branched, substituted or unsubstituted alkyl groups where one or more non-adjacent carbon atoms may be replaced by O, S and/or N, preferably C8-C20;

$R_3$ and $R_4$ are independently of one another groups are linear or branched, substituted or unsubstituted alkyl groups where one or more non-adjacent carbon atoms may be replaced by O, S and/or N, preferably C8-C20;

R5 is a methyl or methoxy group;

and the dye comprises at least one electron-withdrawing group;

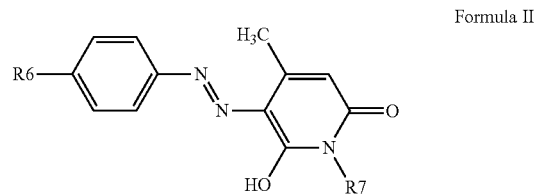

Formula II

Wherein $R_6$ and $R_7$ are independently of one another groups are linear or branched, substituted or unsubstituted alkyl groups where one or more non-adjacent carbon atoms may be replaced by O, S and/or N, preferably C8-C20;

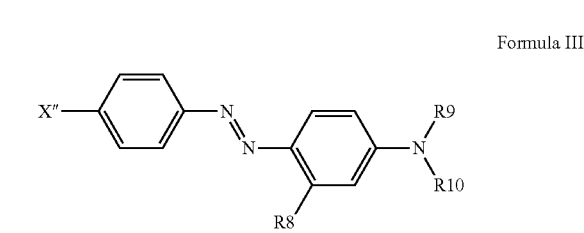

Formula III wherein

X" is an electron-withdrawing group;

$R_8$ is a methyl or methoxy group;

$R_9$ and $R_{10}$ are independently of one another groups are linear or branched, substituted or unsubstituted alkyl groups where one or more non-adjacent carbon atoms may be replaced by O, S and/or N; preferably C8-C20;

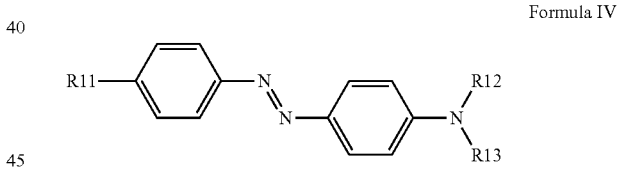

Formula IV wherein $R_{12}$ and $R_{13}$ are independently of one another groups are linear or branched, substituted or unsubstituted alkyl groups where one or more non-adjacent carbon atoms may be replaced by O, S and/or N; preferably C8-C20;

$R_{11}$ is an alkyl or alkoxy group with at least 3 carbon atoms;

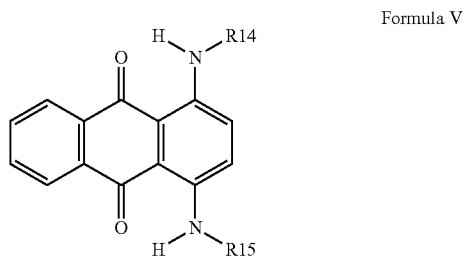

Formula V wherein $R_{14}$ and $R_{15}$ are independently of one another groups are linear or branched, substituted or unsubstituted alkyl groups where one or more non-adjacent carbon atoms may be replaced by O, S and/or N; preferably C8-C20;

Formula VI

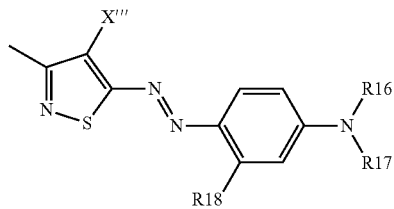

wherein

X''' is an electron-withdrawing group;

$R_{16}$ and $R_{17}$ are independently of one another groups are linear or branched, substituted or unsubstituted alkyl groups where one or more non-adjacent carbon atoms may be replaced by O, S and/or N, preferably C8-C20.

$R_{18}$ is NHCOR with R=linear or branched C1-C10 alkyl groups, preferably NHCOCH$_3$.

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include NO$_2$, CN, halogen, acyl, trifluoromethoxy, trifluoromethyl, SO$_2$F, and CO$_2$R, SO$_2$R, SO$_2$NRR or SO$_2$NHR, with R being independently linear or branched alkyl, preferably C1-C4 alkyl. Preferred electron-withdrawing groups are NO$_2$, CN, Br, Cl, SO$_2$NRR or SO$_2$NHR.

Preferably, dyes of Formula I with linear or branched C8-C20 alkyl groups are used, especially those with additional NO$_2$ and/or CN groups.

Also preferred are dyes of Formula II with linear or branched C8-C20 alkyl groups are used, especially those with additional NO$_2$ and/or CN groups.

It is most advantageous to use mixtures of homologue dyes comprising dyes with different linear or branched alkyl groups, preferably with C8-C20 groups; for example mixtures of dyes with 2-ethylhexyl, n-octyl, 3,5,5-trimethylhexyl, n-decyl, n-undecyl, n-dodecyl, tetradecyl, and/or pentadecyl groups.

Also preferred are dyes of Formulae II, III, V, and VI.

Especially the dyes listed in the following tables may be used.

TABLE 1

| | Cyan Dyes | |
|---|---|---|
| Dye No. | Structure | Compound Data |
| Dye 1 | (structure shown) | UV-vis<br>$\lambda_{max}$ 642 nm, $\epsilon_{max}$ 103,000<br>HBW 44 nm (hexane)<br>$\lambda_{max}$ 595 nm, $\epsilon_{max}$ 48,500<br>HBW 77 nm (hexane)<br>Mp: 95-97° C. |
| Dye 2 | (structure shown)<br>R = n-octyl/2-ethylhexyl/undecyl/dodecyl | UV-vis<br>$\lambda_{max}$ 645 nm, $\epsilon_{max}$ 15,000<br>(hexane)<br>$\lambda_{max}$ 596 nm, $\epsilon_{max}$ 13,250<br>(hexane)<br>Mp: amorphous solid |
| Dye 3 | (structure shown)<br>R = 2-ethylhexyl/dodecyl/tetradecyl/pentadecyl | UV-vis<br>$\lambda_{max}$ 645 nm, $\epsilon_{max}$ 15,750<br>(hexane) $\lambda_{max}$ 596 nm,<br>$\epsilon_{max}$ 14,000<br>(hexane)<br>Mp: amorphous solid |

TABLE 2

Magenta Dyes

| Dye No. | Structure | Compound Data |
|---|---|---|
| Dye 4 | 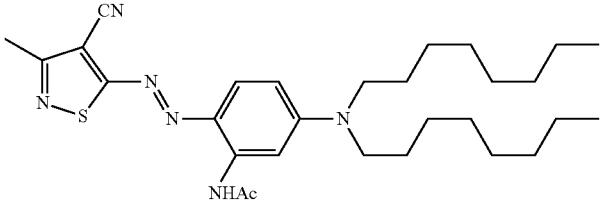 [SMILES: CCCCCCCCN(CCCCCCCC)c1ccc(/N=N/c2snc(C)c2C#N)c(NC(C)=O)c1] | UV-vis<br>$\lambda_{max}$ 536 nm, $\epsilon_{max}$ 61,750<br>HBW 71 nm (hexane)<br>$\lambda_{max}$ 548 nm, $\epsilon_{max}$ 61,000<br>HBW 77 nm (EtOAc)<br>Mp: 110-111° C. |

TABLE 3

Yellow Dyes

| Dye No. | Structure | Compound Data |
|---|---|---|
| Dye 5 | 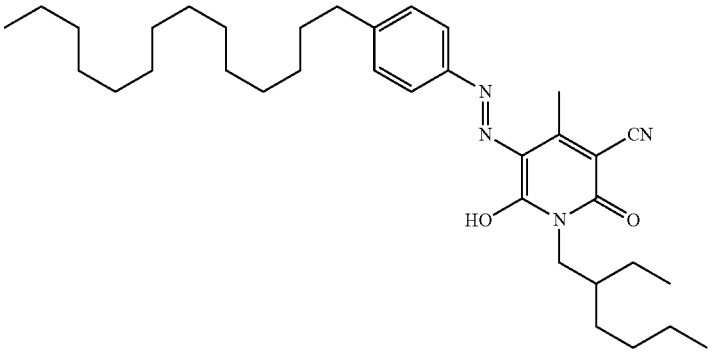<br>C14 | UV-vis<br>$\lambda_{max}$ 436 nm, $\epsilon_{max}$ 45,000<br>HBW 73 nm (hexane)<br>HPLC (420 nm): >99.5%<br>Mp: 73-75° C. |
| Dye 6 | 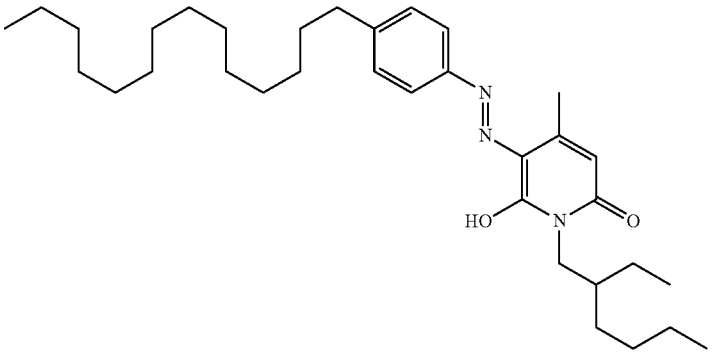<br>C14 | UV-vis<br>$\lambda_{max}$ 416 nm, $\epsilon_{max}$ 38,000<br>HBW 67 nm (hexane)<br>Mp: 63-65° C. |
| Dye 7 | 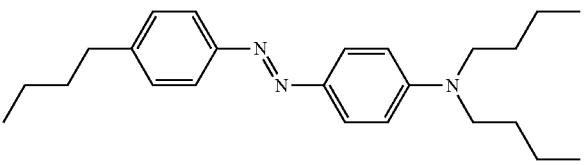 [SMILES: CCCCc1ccc(/N=N/c2ccc(N(CCCC)CCCC)cc2)cc1] | UV-vis<br>$\lambda_{max}$ 407 nm, $\epsilon_{max}$ 8,000<br>HBW 68 nm (hexane)<br>Mp: Oil at room temp |
| Dye 8 | 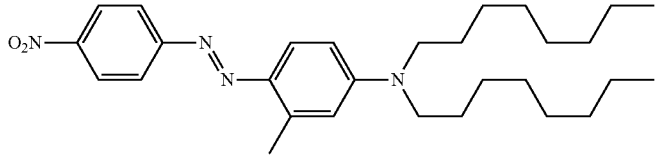 [SMILES: CCCCCCCCN(CCCCCCCC)c1ccc(/N=N/c2ccc([N+](=O)[O-])cc2)c(C)c1] | UV-vis<br>$\lambda_{max}$ 470 nm, $\epsilon_{max}$ 36,000<br>HBW 93 nm (hexane)<br>Mp: 44-46° C. |

Preferably, Dyes 2, 4-7, and 8 can be used. In another preferred variant of the invention mixtures of dyes may be used, for example mixtures of Dye 6.

The following schemes show by way of example the synthesis of dyes of the invention, especially for dyes of Formulas I to VI which can be carried out by processes and under conditions known to the person skilled in the art; further details are given in the examples:

Scheme 1: Dyes of Formula I:

The preparation of dyes of Formula I by a 2 step procedure under convenient conditions as known in the art is exemplified in the following scheme for 4-((E)-(4-((E)-(2,4-Dinitrophenyl)diazenyl)-2,5-bis(2-ethylhexyloxy)phenyl)diazenyl)-3-methyl-N,N-octyl/ethylhexyl-aniline:

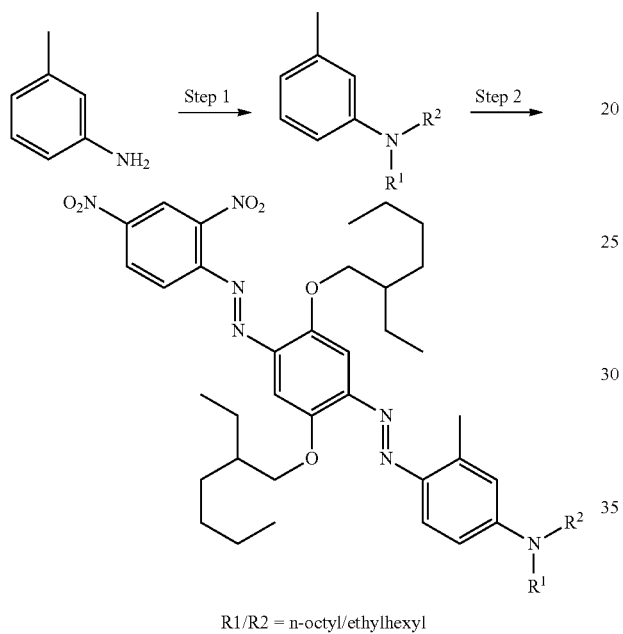

R1/R2 = n-octyl/ethylhexyl

Scheme 2: Dyes of Formula II:

The preparation of dyes of Formula II by a 2 step procedure under convenient conditions as known in the art is exemplified in the following scheme:

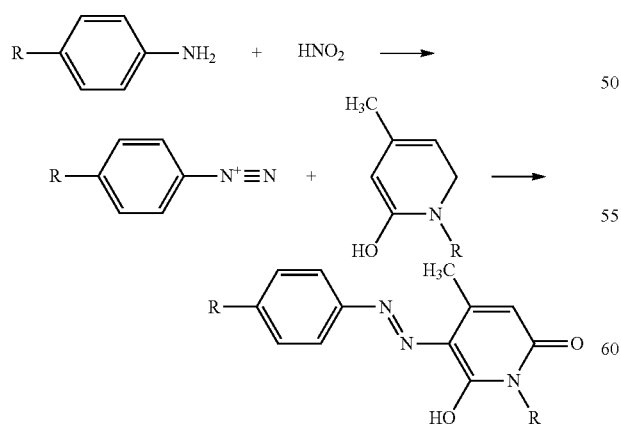

Scheme 3: Dyes of Formula III:

The preparation of dyes of Formula III by a 2 step procedure under convenient conditions as known in the art is exemplified in the following scheme for (E)-3-Methyl-4-((4-nitrophenyl)diazenyl)-N,N-dioctylaniline:

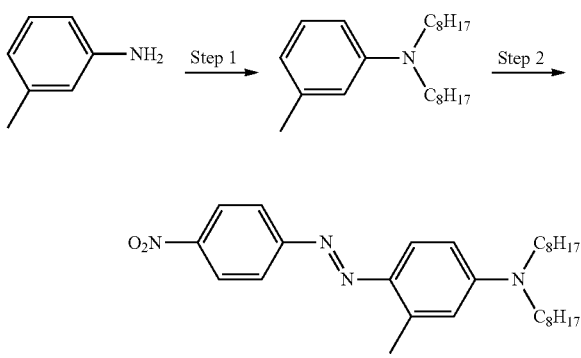

Scheme 4: Dyes of Formula IV:

The preparation of dyes of Formula IV by a 2 step procedure under convenient conditions as known in the art is exemplified in the following scheme

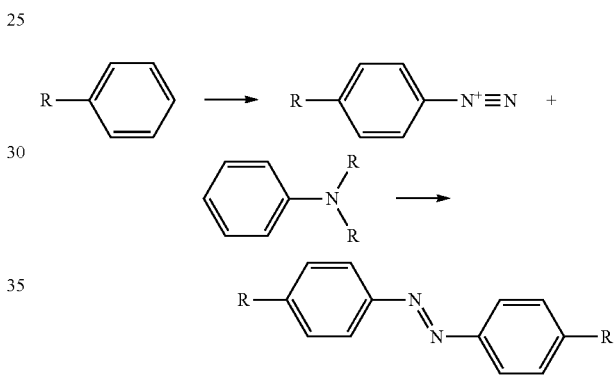

Scheme 5: Dyes of Formula V:

The preparation of dyes of Formula V under convenient conditions as known in the art is exemplified in the following scheme for 1,4-Bis(2-ethylhexyl/n-octyl/n-undecyl/n-dodecyl-amino)anthracene-9,10-dione:

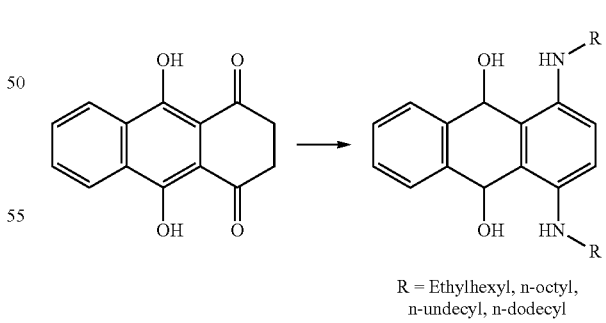

R = Ethylhexyl, n-octyl, n-undecyl, n-dodecyl

Scheme 6: Dyes of Formula 6:

The preparation of dyes of Formula 6 by a 2 step procedure under convenient conditions as known in the art is exemplified in the following scheme for N-(2-((4-Cyano-3-methylisothiazol-5-yl)diazenyl)-5-(dioctylamino)phenyl)acetamide:

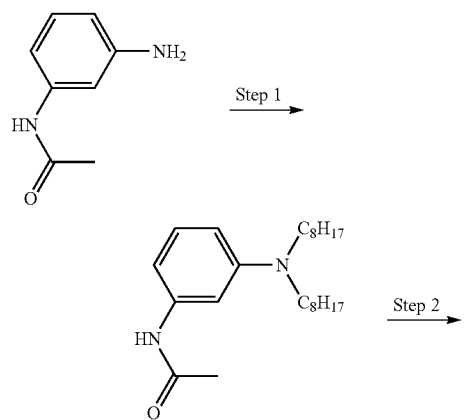
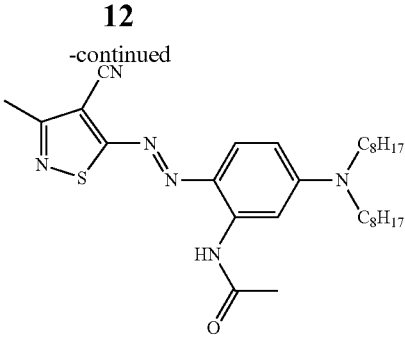
The preparation of further dyes can be carried out analogously to the illustrative reactions shown above and in the examples.
Particularly preferred dyes and dye mixtures are listed in Table 4:
TABLE 4
| Dye ref | Colour | Structure |
|---|---|---|
| Dye 7 | Yellow | |
| Dye 8 | Red | |
| Dye 6/ Dye 2 | Green | |
C14
R = n-octyl/2-ethylhexyl/undecyl/dodecyl TABLE 4-continued

| Dye ref | Colour | Structure |
| --- | --- | --- |
| Dye 2 | Blue | 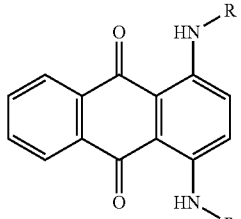<br>R = n-octyl/2-ethylhexyl/undecyl/dodecyl |
| Dye 4 | Magenta | 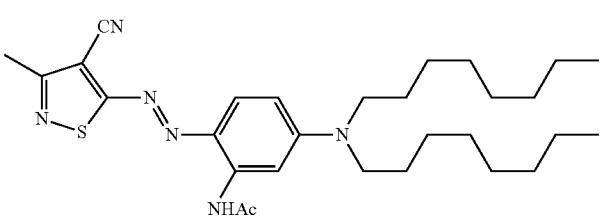 [SMILES: CCCCCCCCN(CCCCCCCC)c1ccc(/N=N/c2snc(C)c2C#N)c(NC(C)=O)c1] |
| Dye 6/<br>Dye 5 | Yellow | 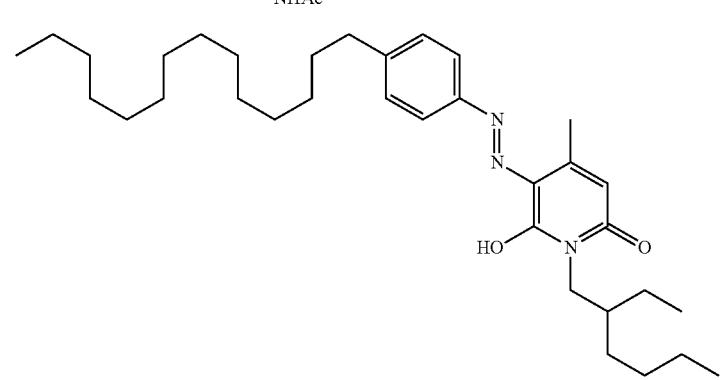<br>C14<br>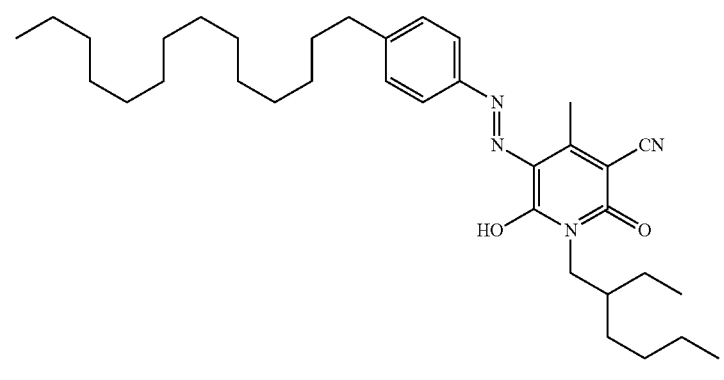<br>C14 |

Another essential component of the electrophoretic fluids of the invention are particles having an index of refraction close to that of the dispersion medium of the EPD fluid, throughout the specification and in the claims called "transparent particles". Suitable particles are SiO$_2$, barium sulfate, calcium carbonate, aluminium oxide, calcium silicate, magnesium fluoride, and polymer particles, i.e. polytetrafluoroethylene (PTFE) particles. Preferably, SiO$_2$ particles and PTFE particles are used. Preferably, SiO$_2$ particles, especially monodisperse SiO$_2$ particles are used.

The transparent particles have preferably a size between 10 and 10000 nm, more preferred is 100 to 1000 nm, and most preferred is 150 to 500 nm.

Electrophoretic fluids of the invention comprise white and black particles which are oppositely charged or chargeable. Any such white and black particles commonly used in electrophoretic fluids may be used in the new electrophoretic fluids.

Usually electrophoretic fluids comprise white inorganic nanoparticles such as titania, alumina or barium sulphate, usually coated with a surface layer to promote good dispersibility in dielectric fluid media. The white particles can preferably be selected from titanium dioxide in the rutil, anatase, or amorphous modification, surface coated titanium dioxide, titanium dioxide based particles, and white polymer particles. The black particles can preferably be selected from carbon black, surface coated carbon black, carbon black based particles, and black polymer particles Preferably, titanium dioxide based pigments are used which could have the rutil, anatase, or amorphous modification, preferably rutil or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765.

Furthermore, the electrophoretic fluids of the present invention may comprise white reflective particles prepared by a process comprising the steps of a) forming a reverse emulsion comprising at least one polymer, at least one white reflective, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. Such white reflective particles are described in WO 2011/154104.

Examples for pigments suitable to achieve colour or black are: Carbon black, chromium (III) oxide green, cobalt blue spinel, iron (III) oxide red, iron (III) oxide orange, iron oxide hydroxide (FeOOH) yellow, iron oxide (Fe3O4) black, iron (II, III) oxide black. Organic pigments with structures based on Cu-phthalocyanine, quinacridone, monoazo, disazo, perylene, naphthalimide, quaterrylene or diketopyrrolopyrrole are also suitable for the present invention. Usually electrophoretic fluids comprise black inorganic particles such as carbon black, copper chromite, etc. usually coated with a surface layer to promote good dispersibility in dielectric media and a dielectric fluid media.

Also, black particles may be used which are prepared by a process comprising the steps of a) forming a reverse emulsion comprising at least one polymer, at least one white reflective or coloured particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. These black particles are described in WO 2013/026519.

Furthermore, the electrophoretic fluids of the present invention may comprise black polymer particles or any other absorbing polymer particles comprising a polymerised or co-polymerised dye. Especially black and/or coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles.

Such black polymer particles are described in WO 2013/079146 and comprise monomer units of at least one polymerisable dye according to Formula 1

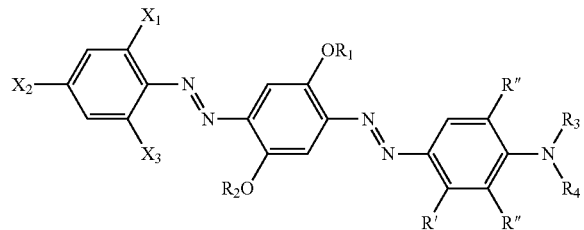

Formula (1)

Wherein $X_1$, $X_2$, and $X_3$ are independently of one another H or an electron-withdrawing group;

$R_1$ and $R_2$ are independently of one another groups of the structure $L_1$-$Y_1$, $L_2$-$Y_2$ or linear, branched or cyclic alkyl groups;

$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N;

$L_1$, $L_2$, $L_3$, and $L_4$ are independently of one another linear or branched, substituted or unsubstituted alkylene groups where one or more non-adjacent carbon atoms may be replaced by O, S and/or N;

$Y_1$, $Y_2$, $Y_3$, and $Y_4$ are independently of one another polymerisable groups;

R' is a linear or branched alkyl group, $OR_5$, H, $NHCOR_6$ or $NHSO_2R_7$;

R" is $OR_5$, H or $NHCOR_6$, $R_5$, $R_6$, and $R_7$ are independently of one another linear or branched alkyl groups; and Wherein at least one of $R_1$, $R_2$, $R_3$ and $R_4$ is a polymerisable group and at least one of $X_1$, $X_2$, and $X_3$ is an electron-withdrawing group. The term "electron-withdrawing group" is well known in the art and refers to the tendency of a substituent to attract valence electrons from neighbouring atoms; in other words the substituent is electronegative with respect to neighbouring atoms.

Coloured particle described in WO 2009/100803, WO 2010/089057, WO 2010/089058, WO 2010/089059, WO 2010/089060, WO 2011/154103 and/or WO 2012/019704 may also be used in electrophoretic fluids of the invention, preferably those described in WO 2010/089057 and/or WO 2012/019704.

White, black, and coloured particles suitable for the invention are preferably spherical particles with a size (diameter) in the range of 50-1200 nm, preferably 50-1000 nm and preferably with a monodisperse size distribution. Preferred particle sizes are 150-950 nm. In a variant of the invention preferred particle sizes are 500-950 nm. Particle sizes are determined by photon correlation spectroscopy of hydrocarbon particle dispersions by a common apparatus such as a Malvern NanoZS particle analyser or preferably by SEM (Scanning Electron Microscopy) and image analysis.

An important aspect of the present invention is that the transparent and the white reflective particles have similar electrophoretic mobility. The electrophoretic mobilities of the white reflective particles and the transparent particles differ at most by 50%. Preferably, the electrophoretic mobilities differ at most by 20%, especially at most by 10%. Particularly, the electrophoretic mobilities of the white reflective particles and the transparent particles differ at most by 5% in order to move with the same velocity when being switched.

If the mobility of the white reflective particles and the transparent particles is not fully synchronised WSR performance is reduced. This disadvantage can be compensated by adding a higher amount of transparent particles. However, speed is hereby reduced.

In a most preferred variant of the invention particles having substantially equal electrophoretic mobilities are used. Advantages can be:
  A constant ratio of white reflective particles to transparent particles each and every time/switching state whether dispersed or compressed at the electrode;
  Optimized dispersion/mixture of white reflective particles to transparent particles;
  Adding only necessary amount of transparent particles for optimized reflectivity necessary.

Electrophoretic mobilities are preferably measured using Malvern NanoZS Zetasizer equipment, or imaging microscopy. The particles are preferably dispersed in dodecane with a suitable charge control agent (CCA).

The transparent and white reflective particles as well as black particles of the electrophoretic fluids are usually charged with typical additives for charging of the particles in EPD. Such additives are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (A-OT) (Aldrich).

In the particles of this invention, preferably Span 85 or AOT provide positive and negative charge to the particles respectively. Further charging agents for EPD particles are described below. The concentration of the CCA in electrophoretic fluids can range between 0.1-30% dependent on particle concentration.

Preferably, the transparent and the white reflective particles are modified with a charge selective dispersant (CSD) polymer stabiliser as described in the earlier patent application PCT/EP2013/000933. The CSD polymer provides the particles with a polymeric shell adsorbed onto the particles wherein the polymeric shell consists of a random polymer having monomer or macromonomer building blocks, and the random polymer comprises at least one hydrocarbon insoluble, charged or chargeable structural unit and at least one hydrocarbon soluble, stabilising structural unit. The polymer modifies the surface charge of the particles and acts as a dispersant.

The CSD polymers can preferably be prepared by free radical polymerisation, polycondensation, and combination of polycondensation followed by free radical polymerisation. A typical CSD is a co-polymer that consists of a hydrocarbon insoluble, charge control part and a hydrocarbon soluble, stabilising part. The two fractions are combined as a random copolymer.

The chemistry of the hydrocarbon insoluble, charge control part is optimised to create a desired charge when adsorbed onto an EPD particle. This part contributes between 1-99% percent by weight of the total CSD, especially preferred are 20-96%. The molecular weight of the total CSD is 5000-500,000. Especially preferred are 5,000-100,000.

The hydrocarbon soluble part of the CSD consists of a hydrocarbon soluble polymer or monomer. Typical are the polycondensates of fatty acids, functional poly-dimethyl siloxanes (PDMS), or long chain alkyl (meth)acrylates. Preferred are the polycondensate of the 12-hydroxystearic acid (PHSA), preferably with a molecular weight of 1000 to 10000, especially 2500 to 7500 and Gelest MCR-M22 (mono-methacrylate terminated Poly-dimethylsiloxanes; PDMS-MA) with a molecular weight of 10000.

The hydrocarbon insoluble part can be prepared from most monomer types, in particular methacrylates, acrylates, acrylamides, methacrylamides, acrylonitriles, alpha-substituted acrylates, styrenes and vinyl ethers, vinyl esters, and propenyl ethers, as long as the resulting polymer is insoluble in hydrocarbons.

The random polymers of the invention usually comprise a hydrocarbon soluble part and a charge control part. Each of these contributes between 1-99% percent by weight to the total CSD. Especially preferred is 20-96% by weight. All weight percentages here and in the following are based on the weight of the total CSD.

When PHSA or PDMS macromonomers are used, the random polymers preferably comprise 20-80% by weight of the hydrocarbon soluble part, especially 30-70% by weight. Advantageously, the random polymers comprise 45-55%, especially 50%, by weight of the hydrocarbon soluble part. The remainder comprises the charge control part in each case.

When smaller hydrocarbon soluble monomers like long chain alkyl (meth)acrylates are used, the random polymers preferably comprise 55-96% by weight of the hydrocarbon soluble part, especially 65-96% by weight. Advantageously, the random polymers comprise 70-90% by weight of the hydrocarbon soluble part. The remainder comprises the charge control part in each case.

Preferred CSD polymers are random copolymers comprising mono-terminated polydimethylsiloxan methacrylate, (2,3-epoxypropyl)-methacrylat, and 2-tert-butylaminoethylmethacrylate as well as graft copolymers comprising polystearate methacrylate, (2,3-epoxypropyl)-methacrylat, and 2-tert-butylaminoethylmethacrylate.

Also random polymers comprising dodecylmethacrylate, and (2-(methylacryloyloxy) ethyltrimethyl ammoniummethylsulfat are preferred.

By varying the monomers in the CSD, charge as well as electrophoretic mobility of the particles can be adopted and the mobility of transparent and the white reflective particles can be synchronised.

Preferably, the CSD provides a positive zeta potential to the transparent and the white reflective particles, whereby these particles get a charge opposite to that of the black particles and move to the electrode of opposite polarity.

Additionally, particle spacing can be controlled electrically. The particle spacing can be varied to change either the whiteness, or colourfulness as desired. For some applications, it may be desirable to have a white 'extreme' state— whereby the display looks white when the white particles are compressed on the top electrode. In this case particle spacing must be minimised, and the coloured state would then have to be achieved electrically using drive schemes. This would consist of a short pulse of DC voltage to move the particles across the distance of the cell. The exact details of drive scheme will vary dependent on the particle speed and required colour saturation. For a formulation with a response time of 100 ms, it could be envisaged that by applying a voltage for 40-45 ms, the particles could be moved to a point of maximum colour saturation. The level of colour saturation could be controlled by applying voltage pulses of different duration.

The present electrophoretic fluids comprising white reflective particles and transparent particles having the same electric charge and electrophoretic mobility and a highly absorbing dye are primarily designed for use in electrophoretic display devices. So, further subjects of the invention are electrophoretic display devices comprising such fluids.

A typical electrophoretic display device which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

The role of the surfactant is to stabilize the dispersion and provide charge to the particles, allowing them to switch electrophoretically. This may be achieved by using a blend of surfactants or one single surfactant.

Surfactant examples are generally those with a hydrophilic head group and a hydrophobic tail.

Typical surfactants (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (A-OT) (Aldrich). Preferable surfactant additives in this work are OLOA, A-OT and derivatives, Span surfactants, and even more preferably A-OT and Span 85.

Any other additives to improve the electrophoretic properties can be incorporated provided they are soluble in the formulation medium, in particular thickening agents or polymer additives designed to minimise settling effects.

The dispersion solvent for the electrophoretic fluids of the invention can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, hexadecane, decane and nonane, and also dimethyltetralin. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol-OT (A-OT), Infineum surfactants and/or Span 85, and dodecane (Sigma Aldrich).

In a variant of the invention, the electrophoretic fluids comprise the preferred dyes described, silica, titania, and carbon black, wherein titania, silica, and carbon black are preferably surface coated.

Electrophoretic fluids of the invention preferably comprise a combination of the preferred components above described. Particularly, combinations of the especially preferred dyes, the especially preferred transparent particles, especially preferred white particles, especially preferred black particles, and especially preferred solvents are used for electrophoretic fluids of the invention.

In a preferred variant of the invention, the electrophoretic fluids of the invention comprise at least one solvent selected from long chain alkanes, at least one of the especially preferred dyes, at least one of the especially preferred transparent particles, at least one of the especially preferred white particles, and at least one of the especially preferred black particles.

Even more preferred electrophoretic fluids of the invention comprise dodecane, tetradecane, decane, nonane or mixtures thereof, the preferred dyes having an absorbance of at least 0.5 a.u., the preferred transparent particles described, white reflective polymer particles prepared by a RESR process described above, and black polymer particles prepared by a RESR process described above or black polymer particles described above comprising a polymerised or co-polymerised dye Even more preferred electrophoretic fluids of the invention comprise dodecane, tetradecane, decane, nonane or mixtures thereof, the preferred dyes having an absorbance of at least 0.5 a.u., white reflective polymer particles modified with a CSD polymer as described above, transparent polymer particles modified with a CSD polymer as described above, and black polymer particles prepared by a RESR process described above or black polymer particles described above comprising a polymerised or co-polymerised dye.

Especially preferred electrophoretic fluids comprise dyes of Formulas I to VI, particularly those listed in Tables 1 to 4 white reflective polymer particles modified with a CSD polymer as described above, transparent polymer particles modified with a CSD polymer as described above, and black polymer particles comprising a polymerised or co-polymerised dye described above.

Usually, all variants of the invention comprise at least one additive, preferably at least one surfactant, especially the preferred surfactants described above. Particularly, electrophoretic fluids of the invention may consist of solvents, dyes, white particles, transparent particles, black particles, and surfactants as described in the foregoing, preferably of all these components described as being preferred, especially of all these components described as being specially preferred.

The solvents and additives used to disperse the polymer particles of the invention are not limited to those used within the examples of this invention and many other solvents and/or dispersants can be used. Lists of suitable solvents and dispersants for electrophoretic displays can be found in existing literature, in particular in WO 99/10767 and WO 2005/017046. The electrophoretic fluid is then incorporated into an electrophoretic display element by a variety of pixel architectures, such as can be found in C. M. Lampert, Displays; 2004, 25(5) published by Elsevier B.V., Amsterdam.

The electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic fluids according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application. Unless the context clearly indicates otherwise, plural forms of the terms used herein are to be construed as including the singular form and vice versa. All of the features of the invention disclosed may be used in any combination, unless clearly indicates otherwise. Particularly, the preferred features of the invention may be used in any combination. Further variants of the invention and combinations of features, especially preferred features are disclosed in and/or derive from the claims and the examples The following examples explain the present invention in greater detail without restricting the scope of protection. In the foregoing and in the following examples, unless otherwise indicated all parts and percentages are by weight.

EXAMPLES

The characterisation of the formulations is performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

All chemicals are purchased from Sigma-Aldrich. All chemicals are purchased at the highest grade possible and are used without further purification unless otherwise stated.

The following abbreviations are used:

IMS industrial methylated spirit;

NMP N-Methylpyrrolidone

THF Tetrahydrofuran

DCM Dichloromethane

Mp melting point

Colour particles in all examples are synthesised as exemplified in WO 2012/019704.

White particles are synthesised as exemplified in the earlier patent application PCT/EP2013/000933.

Black particles are synthesised as exemplified in WO 2013/079146.

The characterisation of the formulations is performed using an Xrite Color i5 spectrophotometer to measure the colour coordinates of the extreme states.

The absorbance of the dyes is measured using a Hitachi U3310 UV-vis spectrophotometer. All dye samples are measured at the concentration used in the examples, with no particles present, in glass cells with a 50 micron spacing.

Example 1: Dye 7: (E)-N,N-dibutyl-4-((4-butylphenyl)diazenyl)aniline

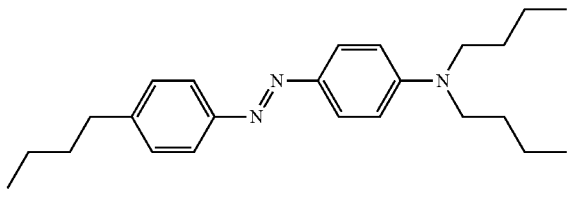 [SMILES: CCCCc1ccc(/N=N/c2ccc(N(CCCC)CCCC)cc2)cc1]

4-Butylaniline (3.0 g, 20 mmol) is dissolved in 0.1N HCl (100 ml) and cooled to <5° C. by adding ice. 2N sodium nitrite solution is added dropwise at 5-10° C. until the solution no longer tested positive to Ehrlich's reagent and the excess nitrous acid is destroyed by adding sulfamic acid. N,N-Dibutylaniline (4.5 g, 22 mmol) is dissolved in a 50/50 mixture of pyridine/water (100 ml), ice (50 g) is added and the diazonium salt solution poured in. After stirring overnight, the resultant oil is extracted into hexane, dried ($Na_2SO_4$) and evaporated. The red oil is dissolved in a minimum volume of hexane, applied to silica gel and eluted with an increasing gradient of dichloromethane (30-50%) in hexane. The fractions containing pure yellow dye are combined and evaporated to an orange oil (6.0 g, 82%), $\lambda_{max}$ (hexane) 407 nm (38,000), FWHM 68 nm; $^1$H NMR (300 MHz, CDCl$_3$) δ 0.92 (3H, t, J 8.5), 0.96 (6H, t, J 8.5), 1.38 (6H, m), 1.64 (6H, m), 2.66 (2H, m), 3.36 (4H, m), 6.68 (2H, dm, J 9.0), 7.26 (2H, dm, J 8.5), 7.74 (2H, dm, J 8.5), 7.82 (2H, dm, J 9.0).

Example 2: Preparation of a Black Polymerisable Dye

Prepared by a 7 step procedure according to Example 3 of WO 2013/079146 as detailed below:

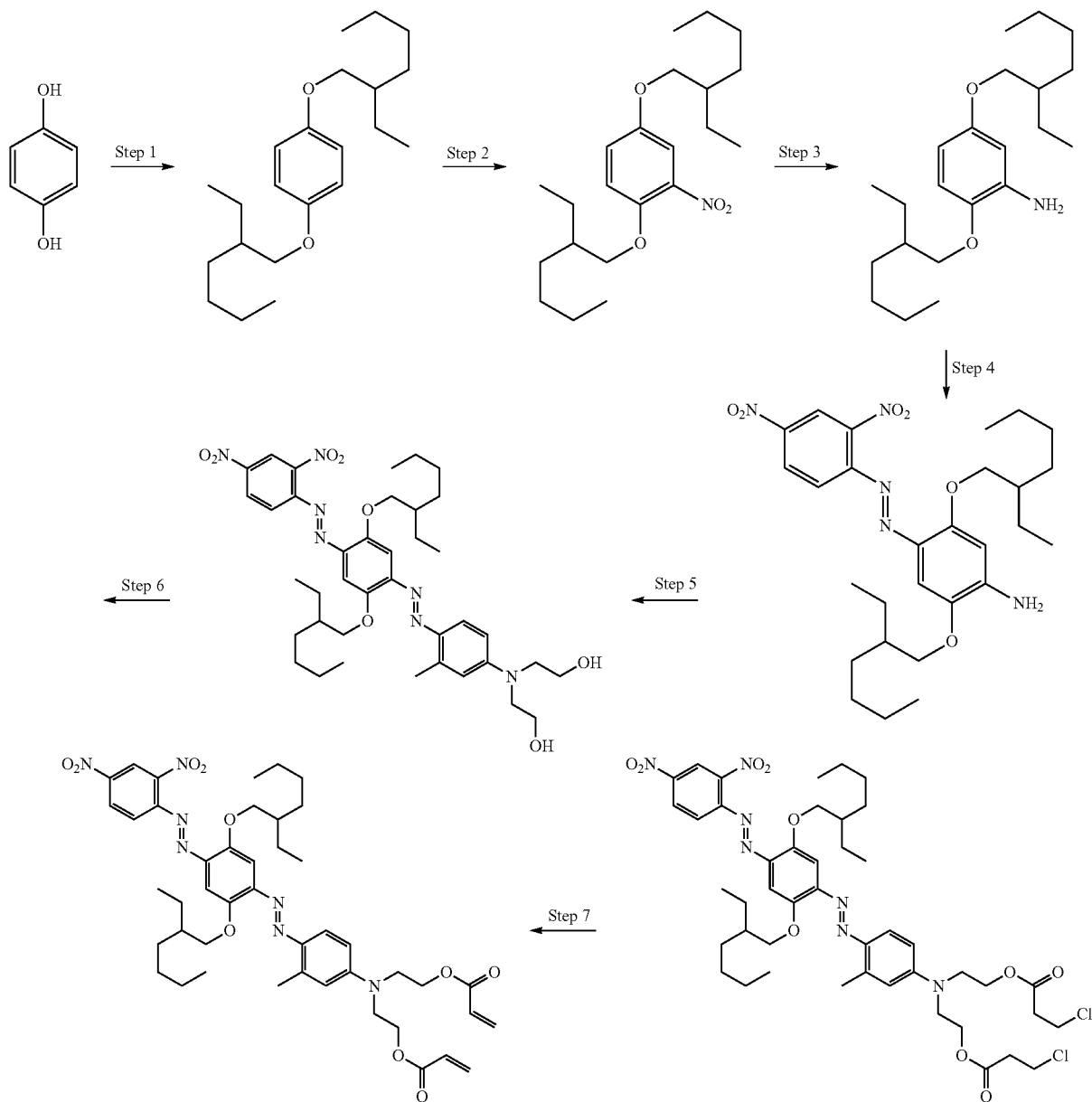

Step 1: 1,4-Bis(2-ethylhexyloxy)benzene

Hydroquinone (37.9 g, 0.344 mol) is suspended in IMS (310 ml) and 1-bromo-2-ethylhexane (132.7 g, 0.687 mol) is added. A solution of KOH (49.9 g, 0.89 mol) in IMS (250 ml) is added slowly over 1 minute. The mixture is heated at reflux whilst monitoring reaction progress by HPLC. After 16 hours, further 1-bromo-2-ethylhexane (53.1 g, 0.27 mol) and solid KOH (20.0 g, 0.36 mol) are added then heated for 2 hours at reflux. The reaction mixture is allowed to cool, is poured into water (1.5 L) and extracted with toluene (500 ml). The organic layer is dried over MgSO$_4$ then evaporated to yield a pale yellow oil. The oil is flashed through silica gel, eluting with 50/50 dichloromethane/hexane to give two product fractions. The initial fraction (35.3 g) co-eluted with 2-ethylhexan-1-ol by-product. The second fraction is evaporated to give pure 1,4-bis(2-ethylhexyloxy)benzene as a pale yellow oil (48.4 g, 42%). The initial fraction is further purified by bulb to bulb distillation to give further pure 1,4-bis(2-ethylhexyloxy)benzene as a pale yellow oil (25.3 g, 22%).

Step 2: 1,4-Bis(2-ethylhexyloxy)-2-nitrobenzene 1,4-Bis(2-ethylhexyloxy)benzene (50.2 g, 0.150 mol) is dissolved in chloroform (150 ml) and cooled to 0° C. Nitric acid (70%, 17.0 g, 0.190 mol) is added dropwise at 0-3° C. and the reaction stirred whilst monitoring progress by HPLC. After 60 minutes, water (50 ml) is added and the organic layer separated, dried (MgSO$_4$) and evaporated to give the title compound as a yellow oil (56.9 g, 100%). The material is used without further purification.

Step 3: 2,5-Bis(2-ethylhexyloxy)aniline 1,4-Bis(2-ethylhexyloxy)-2-nitrobenzene (11.4 g, 0.03 mol) is dissolved in 2-propanol (100 ml) and degassed under vacuum, purging to nitrogen. 10% (w/w) Pd/C (0.52 g) is added and the mixture heated to 80° C. Water (10 ml) is added, followed by solid ammonium formate (18.9 g, 0.3 mol). After a further 1 hour at 80° C., the reaction mixture is allowed to cool then filtered to remove catalyst, to give a colourless solution which darkened rapidly on standing. The material is used immediately as an isopropanol solution (quant.).

Step 4: 4-((2,4-Dinitrophenyl)diazenyl)-2,5-bis(2-ethylhexyloxy)aniline 2,4-Dinitroaniline (3.7 g, 0.02 mol) is suspended in a mixture of acetic acid (20 ml) and propionic acid (10 ml) and cooled to 3° C. 40% (w/w) nitrosyl sulfuric acid in sulfuric acid (6.4 g, 0.02 mol) is added dropwise and stirring continued for 30 minutes to give a pale yellow solution. Crude 2,5-bis(2-ethylhexyloxy)aniline (0.02 mol) solution is diluted with IMS (200 ml) and 10% sulfamic acid solution (20 ml) added, followed by ice (200 g). The above pale yellow diazonium salt solution is slowly added with stirring and a dark oil rapidly separated. The mixture is stirred overnight and the water is decanted off. The crude product (8.3 g) is dissolved in 25/75 dichloromethane/hexane and purified over silica gel, the required product eluting with 50/50 hexane/dichloromethane. Evaporation and trituration with methanol gave 4-((2,4-dinitrophenyl)diazenyl)-2,5-bis(2-ethylhexyloxy)aniline as a violet-blue crystalline solid (4.2 g, 39%).

Step 5: 2,2'-(4-((E)-(4-((E)-(2,4-Dinitrophenyl)diazenyl)-2,5-bis(2-ethylhexyloxy)phenyl)diazenyl)-3-methylphenylazanediyl)diethanol 4-((2,4-Dinitrophenyl)diazenyl)-2,5-bis(2-ethylhexyloxy)aniline (0.54 g, 1 mmol) is dissolved in NMP (10 ml) and to this is added 40% (w/w) nitrosyl sulfuric acid in sulfuric acid (0.38 g, 1.2 mmol). After 30 minutes, the mixture is added to a solution of 2,2'-(m-tolylazanediyl)diethanol (0.20 g, 1 mmol) and sulfamic acid (0.5 g) in IMS (100 ml). A dark oily solid separates immediately. After stirring overnight, the aqueous supernatant is decanted off, the oily solid washed with further water, then dried at 40° C. The pure title compound is acquired as a blue-black solid after multiple purifications over silica gel, eluting with dichloromethane containing an increasing concentration of ethyl acetate (0.54 g, 72%).

Step 6: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl) bis(3-chloropropanoate)

2,2'-(4-((E)-(4-((E)-(2,4-Dinitrophenyl)diazenyl)-2,5-bis(2-ethylhexyloxy)phenyl)diazenyl)-3-methylphenylazanediyl)diethanol (3.5 g, 5 mmol) is dissolved in dichloromethane (50 ml) and sodium bicarbonate (12.6 g, 0.15 mol) is added with stirring to suspend. 3-Chloropropionyl chloride (1.9 g, 15 mmol) is added and the mixture heated at 40° C. (bath temp.) overnight. The inorganics are filtered off, the dichloromethane is evaporated and the product solidified by adding IMS. A 2.7 g sample of crude product is taken through directly to the next step without further purification. A 1 g sample of material is recrystallised from IMS to obtain a pure sample as a violet/black crystalline solid; m.p 123-125° C., $\lambda_{max}$ (EtOAc) 573 nm (40,000), half bandwidth 160 nm, 353 nm (13,500).

Step 7: 2,2'-(4-((E)-(4-((E)-(2,4-dinitrophenyl)diazenyl)-2,6-bis(2-ethylhexyloxy)phenyl)diazenyl)-3-methylphenylazanediyl)bis(ethane-2,1-diyl) diacrylate Crude 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl) bis(3-chloropropanoate) (2.7 g, 2.9 mmol) is dissolved in dichloromethane (50 ml) and triethylamine (0.9 g, 8.7 mmol) is added. The mixture is heated at 30° C. (bath temp.) overnight and the product precipitated by adding IMS. The solid is recrystallised from hot IMS and the title compound is isolated as a violet/black powder; m.p 128-130° C., $\lambda_{max}$ (EtOAc) 574 nm (40,000), half bandwidth 160 nm, 354 nm (13,500).

Example 3: Polystearate Methacrylate (PSMA)

967.5 g of 12-hydroxystearic acid (TCI, H0308) are melted at 115° C. for 2 hours in a pre-weighed 2 liter 3-neck round bottom flask fitted with a thermometer, stopper, vacuum adaptor, magnetic stirrer, and heating mantle. 2.23 g Methane sulphonic acid (Aldrich) is added and the temperature adjusted to 105° C. Vacuum (65 mbar at the beginning and 20 mbar at the end of the reaction) is applied to extract water. The progress of the reaction is monitored in the $^1$H NMR spectrum by following the decrease of the signal strength at 3.6 ppm compared to the 0.9 ppm resonance. The reaction is stopped once 99% conversion is reached.

To 384.0 g of the resulting product, 384.0 g of xylene (Merck, 108685), 0.36 g of N,N-dimethyldodecylamine (Aldrich, 384386), 0.45 g of 4-tert-butylpyrocatechol (Merck, 801987) and 48.5 g of glycidyl methacrylate (Merck, 800609) are added. The reaction is continued at 140° C. under a nitrogen atmosphere. The progress of the reaction is monitored by determining the acid value by titration. The reaction is complete once an acid value of 0.0003 is reached. Titration is performed using a 0.05 M KOH in ethanol solution. Samples of approx. 0.5 g are removed from the reaction, diluted with toluene and titrated against phenolphthalein. The reaction product is diluted with xylene to obtain a polymer solution with a concentration of 50.0%.

Example 4: Charge Selective Dispersant 180 g of n-butyl acetate (Merck, 101974) are pre-heated to 85° C. (temperature at the heating block) in a 500 ml 3-neck flask equipped with reflux condenser, nitrogen supply, and septum. 38.4 g of polystearate methacrylate (Example 3; 52.2% solid dissolved in xylene), 2.0 g of (2,3-epoxypropyl)-methacrylate (Merck, 800609), 18.0 g of 2-tert-butylaminoethyl-methacrylate (Aldrich, 444332), and 0.48 g Vazo 67 (DuPont) are combined and added over a period of 3 hours using a dripping funnel. After addition of the reactants, an additional 0.48 g of Vazo 67 is added and the reaction is allowed to continue for 2 h. A polymer solution with a solid content of 15.2% is obtained.

Example 5: Modified TiO$_2$ Pigment 13.2 g of the resulting polymer solution of Example 3, 10.0 g of TiO$_2$ particles (DuPont, Ti-Pure R960), and 100.0 g dodecane (Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 200 mL round bottom flask, 0.2 g diethanolamine (Merck, 116205) is added, and the mixture is reacted at 120° C. for 5 hours. The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice. The resulting dispersion has a solid content of 36.1%.

Example 6: Modified Monosphere Particles 10 g of freeze-dried, monodisperse $SiO_2$ particles (Merck, Monosphere 250) with a diameter of 250 nm are combined with 6.6 g of the polymer solution of Example 2, and 50 ml of dodecane. The mixture is subjected to ultrasound for 3 min (Branson Sonifier B15, Standard horn and microtip) at 150 W. 0.1 g diethanolamine is added and the dispersion heated for 5 h at 120° C. A nearly transparent, blue translucent dispersion is obtained.

Example 7: Preparation of Black Polymer Particles

Black polymer particles are prepared analogously to Example 6 of WO 2013/079146:

NAD stabiliser 30% by weight in dodecane is obtained from ICI Ltd. precipitated in cold methanol, dried and dissolved in a 50:50 mixture of ethyl acetate (Aldrich) and butyl acetate (Aldrich). All materials other than dyes are commercially available.

Methyl methacrylate (20.58 g), NAD stabiliser (3.50 g) and methacrylic acid (0.42 ml) are weighed out into a 100 ml 3-necked flask equipped with a condenser, nitrogen flow, and an overhead stirrer. 1.029 g (5 weight %) of the black polymerisable dye of Example 2 is added and stirred for 1 minute to facilitate dissolution of the dye. Dodecane (25.20 g) is added to the reaction flask, followed by 1-octanethiol (0.125 ml). The mixture is heated with stirring at 300 rpm, once the temperature in the flask is at 75° C., Vazo 67 (0.20 g) is added and the reaction is stirred for 2 hours.

The resulting solution is filtered through 50 micron cloth to remove small lumps. The particles are cleaned using a centrifuge. Centrifugations are carried out at 10 000 rpm for 40 minutes each, replacing the supernatant with dodecane; this is repeated until the supernatant is colourless. Average particle size is measured by SEM and image analysis: 547 nm.

(Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 100 mL round bottom flask, and the mixture is heated to 120° C. for 4 hours. Remaining coagulates are allowed to sediment and separated from the dispersion. Afterwards, the particles are deposited (benchtop centrifuge, RCF=3000, 20 min) and redispersed in fresh dodecane thrice and filtered through a 50 micron cloth (SEFAR NITEX 03-50/1). The resulting dispersion has a solid content of 41.2%.

Example 9: Electrophoretic Dispersions

Electrophoretic dispersions with white, transparent, and black particles according to Examples 5, 6, and 7 are prepared by vortex mixing of the components in dodecane and then roller mixing of the dispersion. A saturated solution of Dye 7 of Example 1 is added to 1.0 g of the dispersions and vortex mixed. The formulations are roller mixed for 24 hours and then the colour of the saturated colour state is measured using an Xrite Color i5 spectrophotometer in reflection mode, specular excluded, d65 illumination. Amounts of the components and the results are shown in Table 5.

xy colour coordinates are measured at +22V and −22V using the Xrite Color i5 spectrophotometer with integrating sphere, measured in cells of 50 micron thickness with no insulating layers present. Colour State Reflectivity (CSR %) is measured at 22V using the Autronics DMS-301 display measurement system. Ton corresponds to the time in ms taken for the dark state to switch to the bright state (from 10% to 90% of reference values for the extreme states). Toff corresponds to the time in ms taken for the bright state to switch to the dark state (from 90% to 10% of reference values for the extreme states).

Increase in CSR % column and in x,y colour coordinate shows that the colour is more saturated and bright. (yellow is to the top right of the colour space, so high x and high y=improved saturation.

Data also show that increasing silica content slows down response time (trade off).

FIGURES

Figure 2:
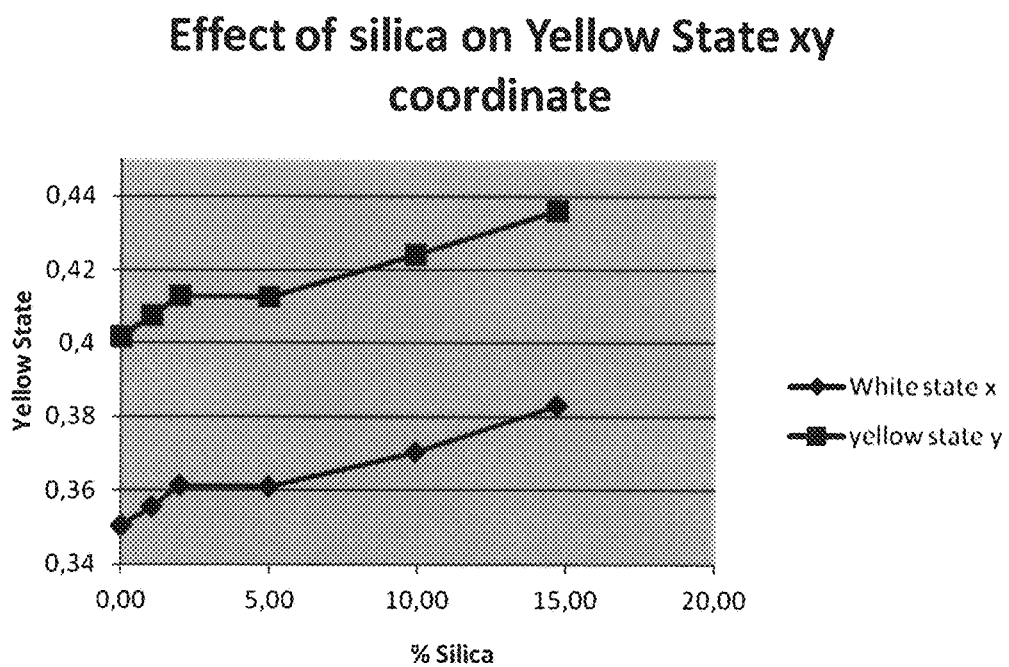

FIG. 1 shows the effect of silica on Yellow State R %
FIG. 2 shows the effect of silica on Yellow State x,y coordinate

TABLE 5

| white particles of Ex. 5 | transparent particles of Ex. 6 | Black particles of Ex. 7 | AOT | alkyl aryl sulfonate | Yellow dye of Ex. 1 | x (+22 V) | y (+22 V) | x (−22 V) | y (−22 V) | CSR % at 22 V | CSR % at 22 V (SWC) | Ton (t90-t10) | Toff (t90-t10) |
|---|---|---|---|---|---|---|---|---|---|---|---|---|---|
| 14.99 | 0.00 | 4.99 | 2.52 | 2.01 | 4.99 | 0.3505 | 0.4019 | 0.4942 | 0.4743 | 19.17 | 18.75 | 102 | 153 |
| 14.99 | 1.01 | 5.00 | 2.50 | 1.99 | 4.92 | 0.3556 | 0.4075 | 0.5025 | 0.4675 | 21.76 | 21.43 | 105 | 176 |
| 14.73 | 1.95 | 4.93 | 2.79 | 1.97 | 5.33 | 0.3612 | 0.4131 | 0.5044 | 0.4677 | 22.58 | 21.18 | 104 | 157 |
| 15.01 | 4.97 | 5.02 | 2.45 | 2.00 | 5.03 | 0.3608 | 0.4126 | 0.5093 | 0.4649 | 24.78 | 22.55 | 162 | 206 |
| 14.89 | 9.94 | 5.05 | 2.54 | 2.00 | 5.17 | 0.3703 | 0.4243 | 0.5154 | 0.4643 | 26.95 | 24.18 | 273 | 274 |
| 14.79 | 14.68 | 4.71 | 2.42 | 1.97 | 5.13 | 0.3829 | 0.4361 | 0.5091 | 0.4560 | 29.76 | 24.2 | 364 | 432 |

Example 8: Modified PTFE Particles 10 g of PTFE particles (Aldrich, 430935) with a diameter of 1000 nm are combined with 3.55 g of the resulting polymer solution of Example 8, and 40 ml Dodecane

The invention claimed is:

1. An electrophoretic fluid comprising at least one solvent, at least one set of coloured particles, at least one highly absorbing dye, at least one set of white reflective particles, and at least one set of transparent particles, wherein the coloured particles and the white reflective particles have opposite electric charge signs and wherein the white reflective particles and the transparent particles have the same electric charge sign and wherein electrophoretic mobilities of the white reflective particles and the transparent particles differ at most by 50%, and wherein the white reflective particles, and the transparent particles comprise a polymeric shell adsorbed onto the particle wherein the polymeric shell consists of a random copolymer having monomer or macromonomer building blocks, and the random polymer comprises at least one hydrocarbon insoluble, charged or chargeable structural unit and at least one hydrocarbon soluble, stabilising structural unit;

wherein the electrophoretic fluid comprises at least one highly absorbing dye according to Formula I, Formula II, Formula III, Formula IV or Formula V

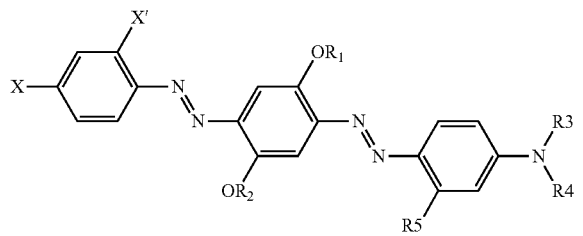

Formula I wherein
X and X' are independently of one another H or an electron-withdrawing group;
R₁ and R₂ are independently of one another groups are linear or branched, substituted or unsubstituted alkyl groups where one or more non-adjacent carbon atoms may be replaced by O, S and/or N;
R₃ and R₄ are independently of one another groups are linear or branched, substituted or unsubstituted alkyl groups where one or more non-adjacent carbon atoms may be replaced by O, S and/or N;
R5 is a methyl or methoxy group;
and the dye comprises at least one electron-withdrawing group;

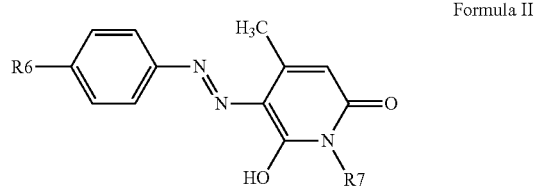

Formula II wherein
R₆ and R₇ are independently of one another groups are linear or branched, substituted or unsubstituted alkyl groups where one or more non-adjacent carbon atoms may be replaced by O, S and/or N;

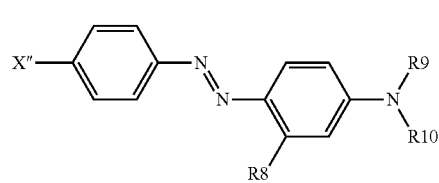

Formula III wherein
X" is an electron-withdrawing group;
R₈ is a methyl or methoxy group;
R₉ and R₁₀ are independently of one another groups are linear or branched, substituted or unsubstituted alkyl groups where one or more non-adjacent carbon atoms may be replaced by O, S and/or N;

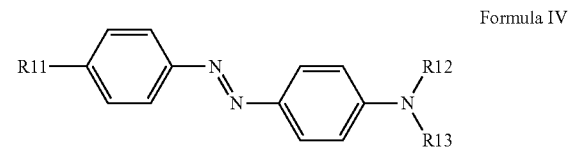

Formula IV wherein
R₁₂ and R₁₃ are independently of one another groups are linear or branched, substituted or unsubstituted alkyl groups where one or more non-adjacent carbon atoms may be replaced by O, S and/or N;
R₁₁ is an alkyl or alkoxy group with at least 3 carbon atoms;

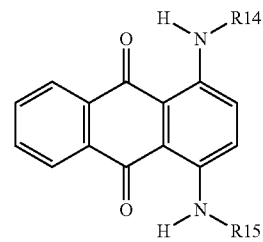

Formula V wherein
R₁₄ and R₁₅ are independently of one another groups are linear or branched, substituted or unsubstituted C8-C20 alkyl groups where one or more non-adjacent carbon atoms may be replaced by O, S and/or N;

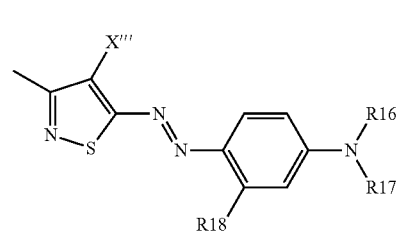

Formula VI wherein
X''' is an electron-withdrawing group;
R₁₆ and R₁₇ are independently of one another groups are linear or branched, substituted or unsubstituted alkyl groups where one or more non-adjacent carbon atoms may be replaced by O, S and/or N;

$R_{18}$ is NHCOR with R=linear or branched C1-C10 alkyl groups.

2. The electrophoretic fluid according to claim 1, wherein the electrophoretic fluid comprises the highly absorbing dye, wherein the coloured particles are black particles, a set of white reflective particles, and a set of transparent particles.

3. The electrophoretic fluid according to claim 1, wherein the electrophoretic mobilities of the white reflective particles and the transparent particles differ at most by 5%.

4. The electrophoretic fluid according to claim 1, wherein the dye or a dye mixture has an absorbance of at least 0.3 a.u. in a cell thickness of 50 microns.

5. The electrophoretic fluid according to claim 1, wherein the electrophoretic fluid comprises silica particles or polytetrafluoroethylene particles as transparent particles.

6. The electrophoretic fluid according to claim 1, wherein the least one set of white reflective particles is selected from the group consisting of titanium dioxide in the rutil, anatase, or amorphous modification, surface coated titanium dioxide, titanium dioxide based particles, and white polymer particles.

7. The electrophoretic fluid according to claim 1, wherein the coloured particles are black particles and are selected from the group consisting of carbon black, surface coated carbon black, carbon black based particles, and black polymer particles.

8. The electrophoretic fluid according to claim 1, wherein the white reflective particles, and the transparent particles comprise a polymeric shell adsorbed onto the particle wherein the polymeric shell consists of a random copolymer selected from random copolymers comprising mono-terminated polydimethylsiloxan methacrylate, (2,3-epoxypropyl)-methacrylat, and 2-tert-butylaminoethylmethacrylate or graft copolymers comprising polystearate methacrylate, (2,3-epoxypropyl)-methacrylat, and 2-tert-butylaminoethylmethacrylate or random copolymers comprising dodecylmethacrylate, and (2-(methylacryloyloxy) ethyltrimethyl ammonium methylsulfate.

9. The electrophoretic fluid according to claim 1, wherein the solvent comprises at least one non-polar solvent having a dielectric constant <10, volume resistivity about $10^{15}$ ohm-cm, viscosity <5 cst, and a boiling point >80° C.

10. The electrophoretic fluid according to claim 1, wherein the electrophoretic fluid further comprises at least one surfactant.

11. A method for the preparation of a mono, bi or polychromal electrophoretic device comprising utilizing the electrophoretic fluids according to claim 1.

12. A method comprising displaying an image with an electrophoretic fluid according to claim 1.

13. An electrophoretic display device comprising an electrophoretic fluid according to claim 1.

14. The Electrophoretic display device according to claim 13, wherein the electrophoretic fluid is applied by a technique selected from inkjet printing, slot die spraying, nozzle spraying, and flexographic printing, or any other contact or contactless printing or deposition technique.

* * * * *